(12) United States Patent
Harvey et al.

(10) Patent No.: US 10,357,017 B2
(45) Date of Patent: Jul. 23, 2019

(54) PORTABLE LIVESTOCK SUN SHADE

(71) Applicant: Rush Company, Inc., Springfield, SD (US)

(72) Inventors: Christopher Harvey, Springfield, SD (US); Daniel Fathke, Springfield, SD (US); William Shorma, Springfield, SD (US); Andrew Hejna, Springfield, SD (US)

(73) Assignee: Rush Company, Inc., Springfield, SD (US)

( * ) Notice: Subject to any disclaimer, the term of this patent is extended or adjusted under 35 U.S.C. 154(b) by 0 days.

(21) Appl. No.: 15/894,636

(22) Filed: Feb. 12, 2018

(65) Prior Publication Data

US 2019/0075751 A1    Mar. 14, 2019

Related U.S. Application Data

(60) Provisional application No. 62/557,993, filed on Sep. 13, 2017.

(51) Int. Cl.
*A01K 1/00* (2006.01)
*E04H 15/58* (2006.01)
*E04H 15/64* (2006.01)
*E04H 15/32* (2006.01)

(52) U.S. Cl.
CPC ........... *A01K 1/0035* (2013.01); *E04H 15/32* (2013.01); *E04H 15/58* (2013.01); *E04H 15/64* (2013.01)

(58) Field of Classification Search
CPC ........ A01K 1/0035; A01K 5/01; E04H 15/58; A45B 2023/0093
See application file for complete search history.

(56) References Cited

U.S. PATENT DOCUMENTS

| | | | | |
|---|---|---|---|---|
| 2,842,096 A | * | 7/1958 | Bradfield | A01K 5/0225 119/52.4 |
| 2,933,062 A | * | 4/1960 | Geerlings | A01K 5/0241 119/52.4 |
| 3,330,257 A | * | 7/1967 | Warner, Sr. | A01K 5/01 119/61.3 |
| 3,547,082 A | * | 12/1970 | Hallman | A01K 5/0225 119/53 |
| 4,546,730 A | * | 10/1985 | Holland | A01K 5/0114 119/61.57 |

(Continued)

OTHER PUBLICATIONS

Shade Haven 1200 & Shade Haven 600; http://shadehaven.net/; http://shadehaven.net/photos/#SH1200; http://shadehaven.net/sh_product/sh600/—12 pages.

(Continued)

*Primary Examiner* — Noah Chandler Hawk
(74) *Attorney, Agent, or Firm* — Moss & Barnett; Michael A. Bondi

(57) ABSTRACT

A portable livestock sun shade that includes a base, a support material, a ballast container and a canopy. The support structure is mounted with respect to the base. The ballast container is mounted with respect to the base. The ballast container is adapted to receive a ballast material. The canopy is attached to the support structure. The canopy is capable of blocking at least a portion of solar rays. The canopy has an area that is greater than an area of the base.

22 Claims, 8 Drawing Sheets

(56) References Cited

U.S. PATENT DOCUMENTS 8,919,287 B2 * 12/2014 Aisthorpe ............ A01K 5/0107
119/61.1
9,426,969 B1 * 8/2016 Hundt .................. A01K 13/006

OTHER PUBLICATIONS

3J&G Shade LLC.; http://www.3jandgshade.com/index.htm;http://www.3jandgshade.com/information.htm; 3 pages.
West Point Design Inc.; http://www.westpointimp.com/design/products/shade-all—1 page.
T&T Quality Buildings; https://www.facebook.com/ttqualitybuildings/—9 pages.
Strobel Manufacturing Shade; http://www.strobelmfg.com/strobel-super-shade—1 page.
Feeder Systems Shade; http://feedingsystems.biz/—2 pages.

* cited by examiner

PORTABLE LIVESTOCK SUN SHADE

REFERENCE TO RELATED APPLICATION

This application claims priority to Provisional Applic. No. 62/557,993, filed on Sep. 13, 2017, the contents of which are incorporated herein by reference.

FIELD OF THE INVENTION

The invention generally relates to sun shades. More particularly, the invention relates to portable livestock sun shades.

BACKGROUND OF THE INVENTION

It is known that certain environmental factors can cause animals to experience stress. When the animals experience stress, the animals' health weakens and they tend to grow more slowly than if the animals are not subjected to the stress. In certain situations, the stress can result in death of the animals. This factor is particularly important when the animals are in a commercial agricultural facility. In view of the preceding, it is desirable to minimize the stress that is experienced by agricultural animals.

One environmental factor that is known to cause stress to animals is exposure to the sun. Direct sunshine upon the animals when combined with high humidity, high ground temperatures and/or high environmental temperatures causes an animal's body temperature to elevate resulting in increased stress and in prolonged high temperatures, often death. A number of livestock shade systems have been developed. All of these livestock sun shade systems are deficient when compared to the portable livestock sun shade system described herein.

SUMMARY OF THE INVENTION

An embodiment of the invention is directed to a portable livestock sun shade that includes a base, a support structure, a ballast container and a canopy. The support structure is mounted with respect to the base. The ballast container is mounted with respect to the base. The ballast container is adapted to receive a ballast material. The canopy is attached to the support structure. The canopy is capable of blocking at least a portion of solar rays. The canopy has an area that is greater than an area of the base.

An embodiment of the invention is directed to a method of using a portable livestock sun shade. A livestock sun shade is provided that includes a base, a support structure, a ballast container and a canopy. The support structure is mounted with respect to the base. The ballast container is mounted with respect to the base. The canopy is attached to the support structure. The canopy has an area that is greater than an area of the base. The portable livestock sun shade is moved to a location where it is desired to provide shade to the ground and the livestock. A ballast material is placed in the ballast container. At least a portion of solar rays are blocked with the canopy.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
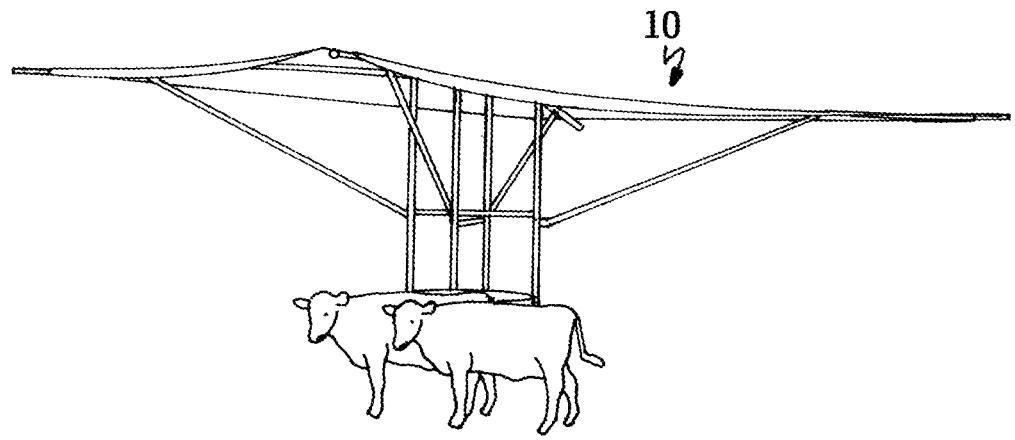
FIG. 1 illustrates a portable livestock sun shade being used in an agricultural facility or pasture according to an embodiment of the invention.
Figure 2:
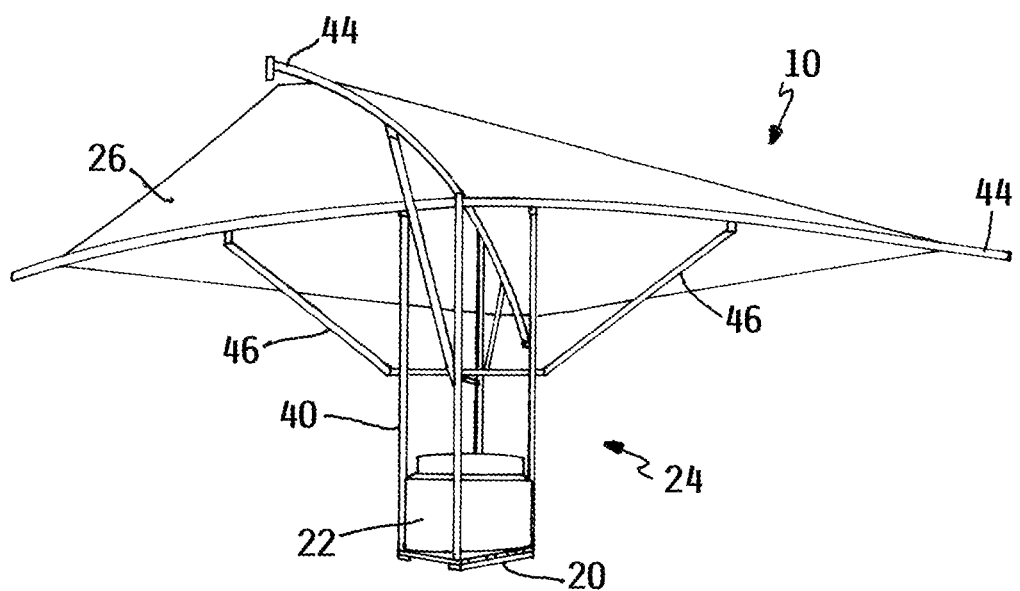
FIG. 2 illustrates the portable livestock sun shade in an extended configuration.

An embodiment of the invention is directed to a portable livestock sun shade as illustrated as 10 in FIGS. 1 and 2. The portable livestock sun shade 10 generally includes a base 20, a ballast container 22, a support structure 24 and a canopy material 26.

Figure 5:
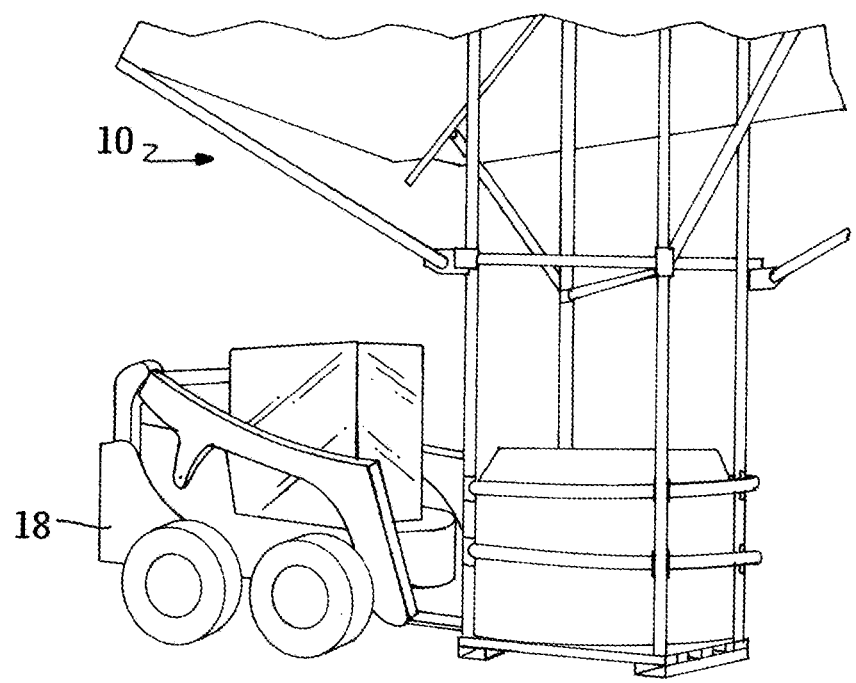
FIG. 5 illustrates the portable livestock sun shade in an assembled configuration being moved using a mechanical device.

The portable livestock sun shade 10 is particularly suited for movement to various locations such as using a transport vehicle 18 that is typically found in agricultural facilities such as a tractor or a skid steer loader as illustrated in FIG. 5. Because the portable livestock sun shade 10 may be readily moved, it is suited for use in conjunction with rotational penning agricultural operations, open pastures and animal feedlots. The portable livestock sun shade 10 also facilitates pen cleaning and sanitizing operations by being easily moved from pen to pen or pasture to pasture. Alternatively, it is possible for the portable livestock sun shade 10 to be towed by a small horsepower tractor or a truck by attaching to the base 20.

The canopy material 26, which has an area that is greater than an area of the base 20, is capable of blocking at least a portion of solar rays. The portable livestock sun shade 10 is adapted for covering a large number of animals. For example, when the sides of the portable livestock sun shade 10 have a length of about 40 feet, the portable livestock sun shade 10 can provide shade for approximately 100 cattle.

Figure 3:
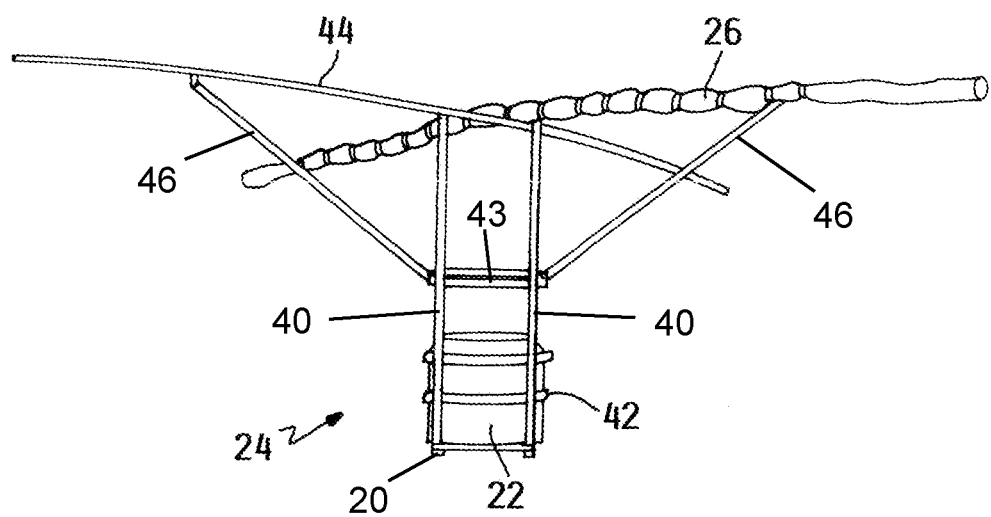
FIG. 3 illustrates the portable livestock sun shade in a storage configuration.

In addition to being adapted for movement to different locations, the portable livestock sun shade 10 is adapted for being readily moved between a use configuration (illustrated in FIG. 2) and a storage configuration (illustrated in FIG. 3). The storage configuration is useful in areas of snow fall and reduces exposure to high winds when not in use.

Figure 6:
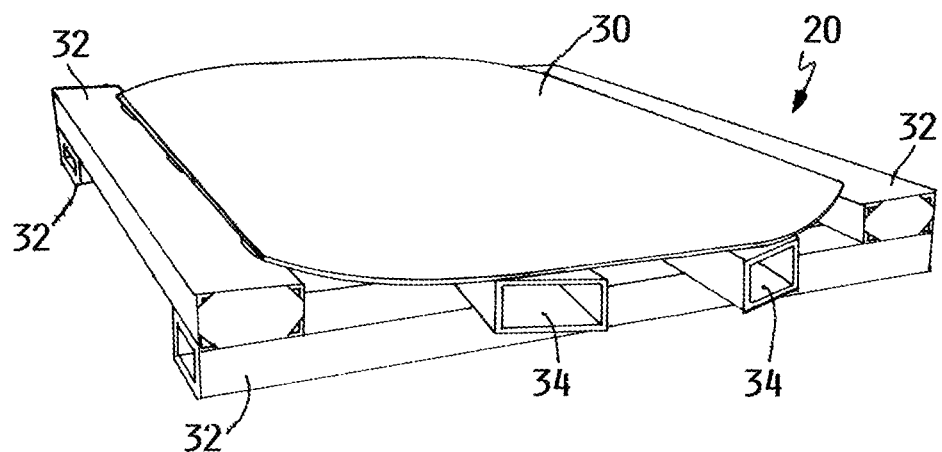
FIG. 6 illustrates a front view of a base for the portable livestock sun shade.
Figure 7:
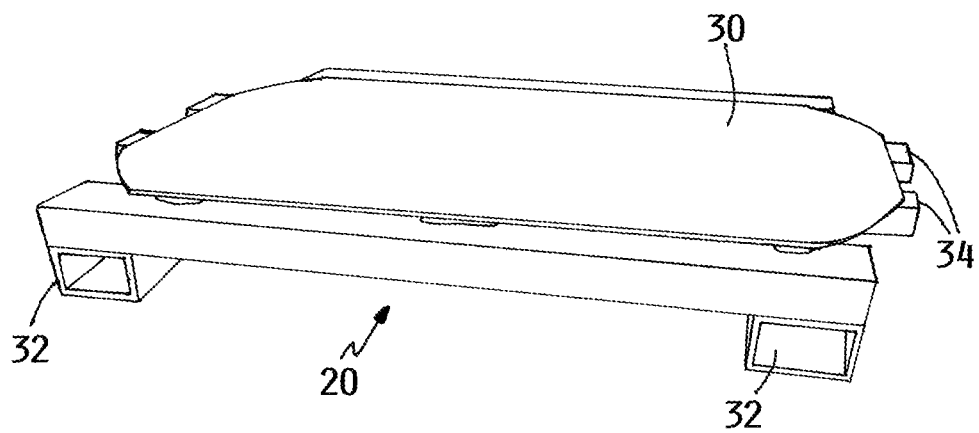
FIG. 7 illustrates a side view of the base for the portable livestock sun shade.

The base 20, which is illustrated in FIGS. 6 and 7, serves two primary functions—supporting the shade support structure 22 on a variety of surfaces and facilitating movement of the portable livestock sun shade 10 between locations. The base 20 also serves as a shipping pallet, which is described in more detail herein.

The base 20 may have a generally flat upper surface 30 on which the ballast container 22 is intended to be placed. In this regard, the upper surface 30 may be formed with a size and shape that are similar to a size and a shape of the ballast container 22 that is intended to be used in conjunction with the base 20.

The base 20 also includes a plurality of frame members 32 that enhance the structural rigidity of the base 20. In certain embodiments there are four frame members that are arranged to extend around a periphery of the base 20. A person of skill in the art will appreciate that the frame members 32 need to be fabricated with a strength that resists deformation based upon the forces that are anticipated to be encountered during movement of the portable livestock sun shade 10 as well as during use of the portable livestock sun shade 10. In certain embodiments, at least a portion of the frame members 32 is fabricated from a metallic material.

The base 20 may also include at least one lifting receptacle 34. In certain embodiments, the at least one lifting receptacle 34 has an elongated shape with openings in at least one end thereof that are adapted to receive lifting elements such as are found on a conventional skid steer loader or forklift. In certain embodiments, there are at least two lifting receptacles 34 facing a front side of the base 20 and at least two lifting receptacles 34 facing a side of the base 20. The lifting receptacles 34 may be the same as or separate from the frame members 32.

The ballast container 22 may assume a variety of configurations. In certain embodiments, the ballast container 22 is a substantially hollow vessel that is adapted to receive a liquid such as water. A benefit of using such a configuration is that the ballast container 22 may be transported in an empty configuration where the ballast container 22 is relatively light.

Once at a desired use location, the ballast container 22 may be filled with water that is typically available at locations where animals are raised in agricultural settings. Another benefit of using water in the ballast container 22 is that the amount of water can be varied depending on factors such as the size of the canopy and the wind typically experienced in the location at which the portable livestock sun shade 10 is intended to be used. In certain embodiments, the ballast container 22 may have a weight of between about 2,000 pounds and about 10,000 pounds when filled with water. In certain embodiments, the empty weight of the portable livestock sun shade 10 is about 1,600 pounds.

In view of the preceding, the ballast container 22 may include a water inlet port proximate an upper end thereof and a drain port proximate a lower end thereof. A person of skill in the art will appreciate that a variety of techniques may be used for adding water to and removing water from the ballast container 22.

As an alternative to the ballast container 22 filled with water, it is possible to fill the ballast container with a solid granular material such as sand. It is also possible to use other materials to provide weight on the base 20. Examples of such alternative materials are sandbags and concrete blocks.

The support structure 24 may include a plurality of vertical support members 40. The vertical support members 40 may be attached to the base 20 proximate corners thereof. A person of skill in the art will appreciate that a variety of techniques may be used for attaching the vertical support members 40 to the base 20. In certain embodiments, the vertical support members 40 are removably attached to the base 20 to facilitate transporting the portable livestock sun shade 10 from a manufacturer or a distributor to a location where it is desired to use the portable livestock sun shade 10.

To enhance a stability of the vertical support members 40, at least a portion of the vertical support members 40 may be interconnected with a bracing member 42. The bracing members 42 may be attached at an intermediate location on the vertical support members 40. The bracing member 42 may also at least partially extend around the ballast container 22 when the ballast container 22 is placed on the base 20. The bracing member 42 thereby minimizes the potential that the ballast container 22 will move with respect to the base 20 either while the portable livestock sun shade 10 is in use or while the portable livestock sun shade 10 is being moved. Additionally or alternatively, the bracing member 42 may function as rub guards that protect the ballast container 22 by cattle rubbing up against it.

Figure 8:
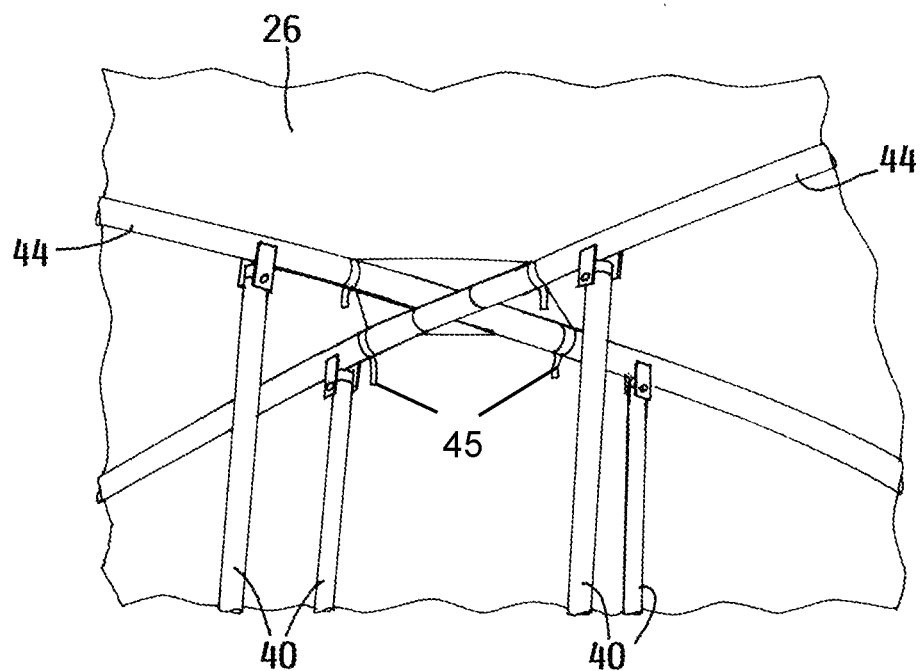
FIG. 8 illustrates a first view of a support structure for the portable livestock sun shade.
Figure 9:
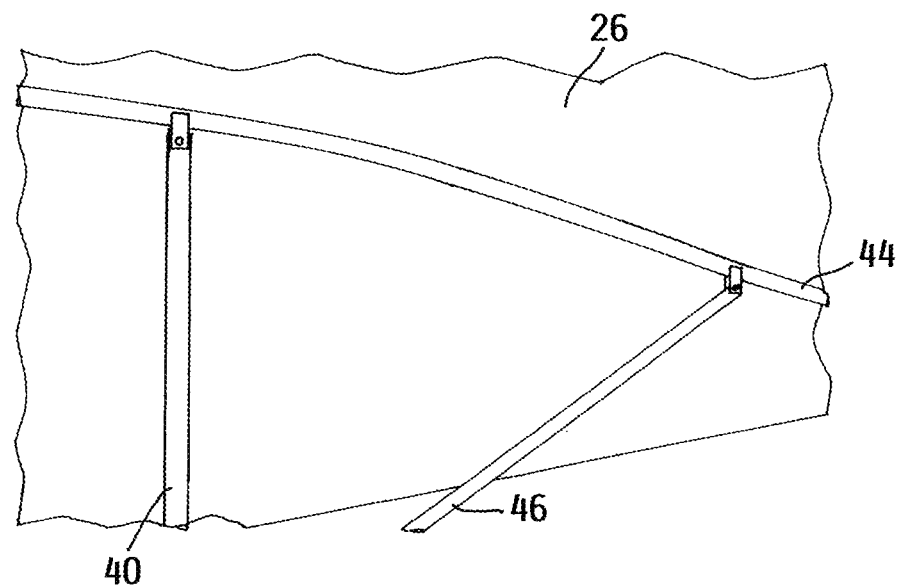
FIG. 9 illustrates a second view of the support structure.

The support structure 24 also includes canopy support members 44 that are attached to the vertical support members 40, as illustrated in FIGS. 8 and 9. In certain embodiments, the canopy support members 44 are attached to ends of the vertical support members 40 that are opposite the base 20. In certain embodiments, the canopy support members 44 are removably attached to the vertical support members 40 to facilitate disassembling the portable livestock sun shade 10 for shipping and storage.

The canopy support members 44 are selected with a length depending on the area that is desired to be covered by the portable livestock sun shade 10. In certain embodiments, the canopy support members 44 have a length of between about 40 feet and about 60 feet when assembled and between about 14 feet and about 21 feet when disassembled. In other embodiments, the canopy support members 44 have a length of between about 15 feet and about 30 feet.

The canopy support members 44 may be formed from a variety of materials based upon the area that is desired to be covered with the portable livestock sun shade 10. In certain embodiments, the canopy support members 44 are fabricated from metallic tubing having a generally cylindrical profile.

The canopy support members 44 may have an arched configuration to put tension on the canopy material 26 and thereby reduce degradation of the canopy material 26 caused by flexing in response to air movement.

The metallic materials used for the base 20 and the support structure 24 resists degradation when exposed to environmental conditions that are typically experienced on an agricultural facility. An example of one suitable type of metallic material is galvanized steel.

Center cam buckles and/or web straps 45 may be attached to the canopy material 26 near the center of the canopy support members 44 and a plurality of cam buckles and/or web straps may be added to the cover to attach to the canopy support members 44 intermittently along the length of the canopy support members 44 to reduce the potential of the canopy material 26 being lifted away from the canopy support members 26 in response to air movement.

Depending on the area that is intended to be covered with the portable livestock sun shade 10, the support structure 24 may include at least one diagonal brace member 46 that extends between the vertical support member 40 and the canopy support members 44 a distance from where the vertical support member 40 and the canopy support members 44 are attached to each other as illustrated in FIGS. 3 and 9. The diagonal brace members 46 may be removably attached to the vertical support member 40 and the canopy support member 44 to facilitate disassembly of the portable livestock sun shade 10 for shipping and storage.

The canopy material 26 may be fabricated using a variety of materials. In certain embodiments, the canopy material 26 may be flexible. An important feature of the canopy material 26 is that the canopy material 26 blocks at least a portion of solar rays to reduce the stress on the animals caused by the sun. The canopy material 26 may permit air to flow therethrough such as mesh. In certain embodiments, the canopy material 26 does not let at least part of water such as from rain to pass therethrough. In other embodiments, the canopy material 26 may be non-porous or rigid.

In certain embodiments, the canopy material 26 is fabricated in two pieces that each have a similar shape and size. An advantage of this configuration is that it is possible to replace a damaged part of the canopy material 26 rather than replacing the entire canopy material 26.

One suitable mechanism for attaching a multiple piece canopy material 26 to the canopy support members 44 is to use a double C-channel strip 50 in conjunction with rope 52 sewn in to at least one edge of each canopy piece for insertion into C-channel strip.

In certain embodiments, the outer edges of the canopy material 26 may have a concave shape. Using such a configuration enhances the ability to avoid slack when the canopy material 26 is in the extended configuration and under cable tension 64. Such slack can lead to premature degradation of the canopy material 26 as described earlier.

As an alternative to forming substantially all of the canopy material 26 from the same material such as mesh, it is possible to form a central region 26a of the canopy material from a mesh and have a border region 26b that extends at least partially around the central region 26a. In certain embodiments, the border region 26b may have enhanced strength and/or durability as compared to the material from which the central region 26a is formed. An example of one material that may be used on the border region 26b is vinyl coated polyester industrial fabric.

An alternative to fabricating the canopy support members 44 in a one-piece configuration, the invention contemplates use of a support end section 60 that is operably attached to the canopy support member 44. Using such a configuration facilitates easy assembly and removal of the support end section 60 if one of the components therein becomes damaged or otherwise needs to be replaced.

This configuration also facilitates adjusting a position of the support end section 60 with respect to the canopy support member 44 such as if the canopy material stretches. One technique that may be used for adjusting the position of the support end section 60 with respect to the canopy support member 44 is a bolt 62.

To further minimize the movement of the canopy material 26, a cable 64 may extend through an edge of the canopy material 26. A variety of techniques may be used for engaging the cable 64 and the canopy material 26. In certain embodiments, a channel (not shown) extends through the canopy material 26 along the edge thereof.

A first end of the cable 64 is attached to a distal end of the canopy support member 44 or the support end section 60. A second end of the cable 60 engages a winch 66 that is attached to the distal end of the canopy support member 44 or the support end section 60 that is adjacent to the canopy support member 44 or the support end section 60 to which the first end is attached. The winch 66 enables the cable to be tightened. A person of skill in the art will appreciate that a variety of mechanisms may be used to operate the winch 66.

Figure 4:
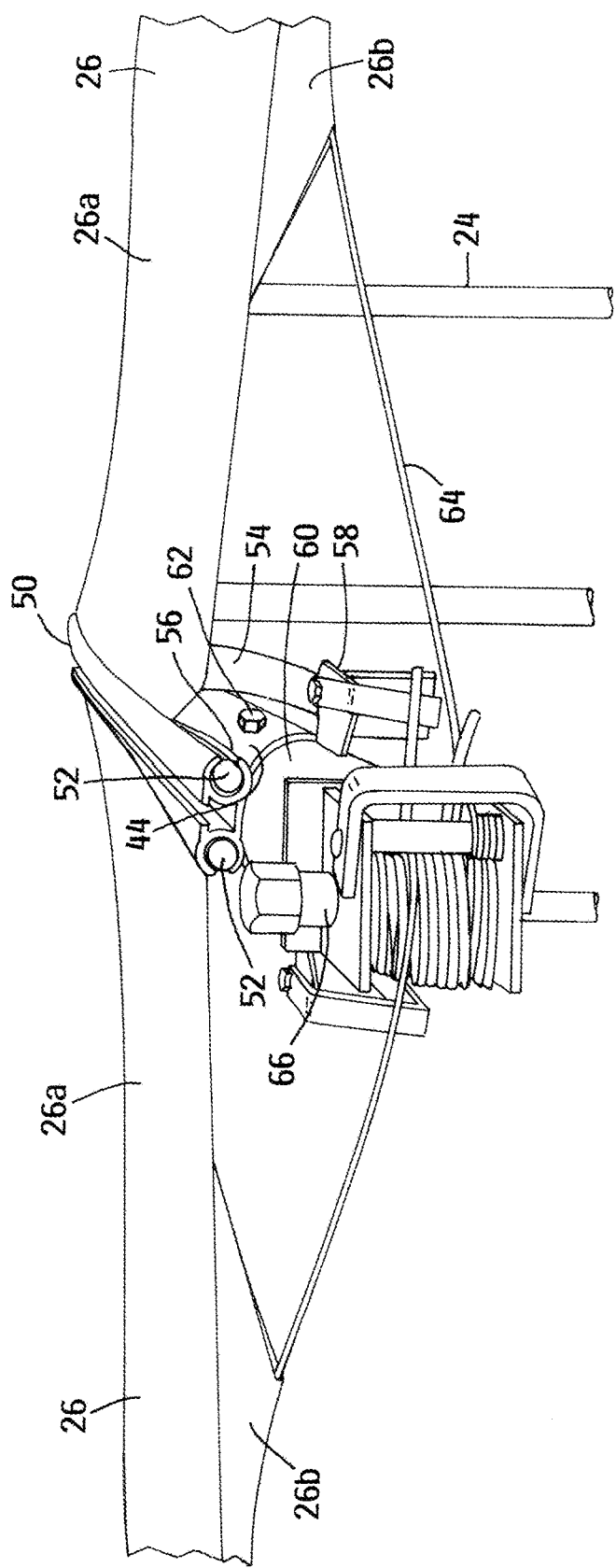
FIG. 4 is a close-up view of a corner of the portable livestock sun shade.

One technique for operably attaching the canopy material 26 to the support structure 24 is illustrated in FIG. 4. A channel 50 is provided such as on an upper surface of the canopy support member 44. In certain embodiments, the channel 50 is referred to as a keder strip.

The canopy material 26 is slidable with respect to the channel 50 to retain the canopy material 26 in engagement with the channel 50. A rope 52 may be attached to a leading edge of the canopy material 26 to facilitate pulling the canopy material 26 through the channel 50. When the rope 52 is used, a clamp 56 may be attached to the rope 52 proximate the end of the channel 50 to retain the canopy material 26 in the extended use configuration.

Alternatively or additionally, a strap 54 may be attached to the leading edge of the canopy material 26 proximate the channel 50. The strap 54 is adapted for grasping by a person's hand for pulling the canopy material 26 to the extended use configuration.

Figure 12:
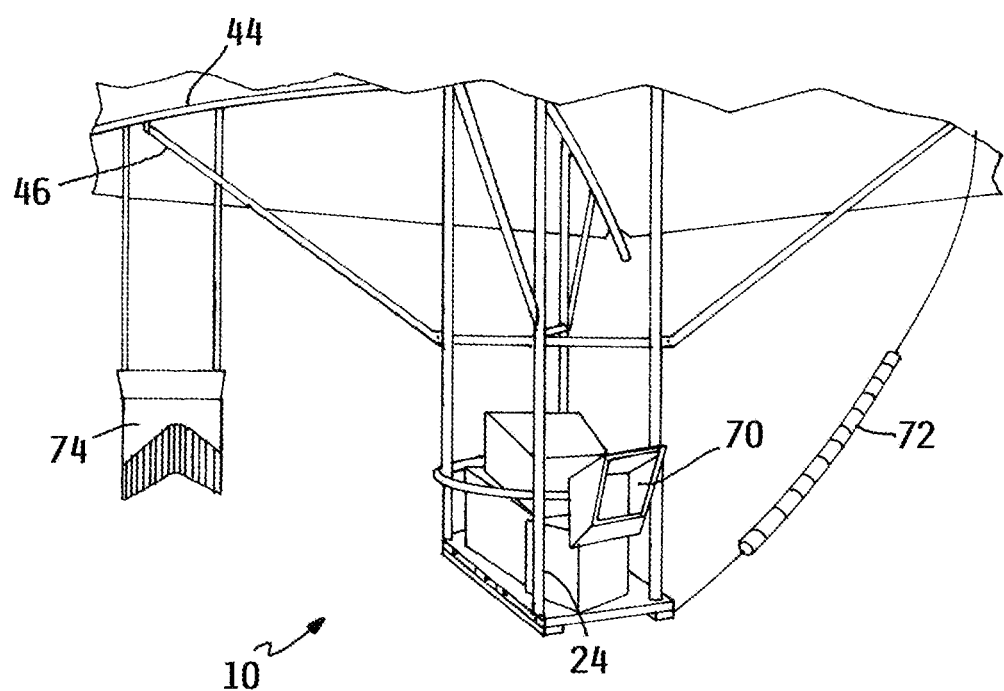
FIG. 12 illustrates accessories used in conjunction with the portable livestock sun shade.

Accessories may be used in conjunction with the portable livestock sun shade 10, as illustrated in FIG. 12. Examples of the accessories include mineral feeders 70, animal scratchers 72, cattle oilers/bug repellent applicators 74 and water sprinklers or misters.

In one configuration, the mineral feeder 70 includes a receptacle in which the mineral supplement is placed. A person of skill in the art will appreciate that it is possible to use a similar device for holding animal feed. In one configuration, the animal scratcher 72 includes a plurality of chains.

In one configuration, the cattle oiler/bug repellant applicator 74 includes a reservoir and a dispensing device such as strings onto which the liquid is dispensed and which come into contact with the cattle. In certain embodiments, the accessories are attached to at least one of the vertical support members 40, the diagonal brace members 46 and the bracing members 42.

Figure 10:
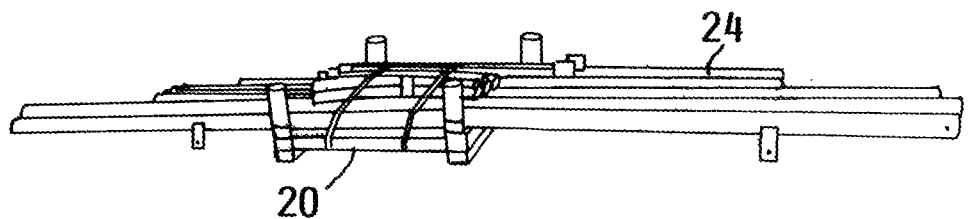
FIG. 10 illustrates the metal structural components of the portable livestock sun shade in a shipping configuration.
Figure 11:
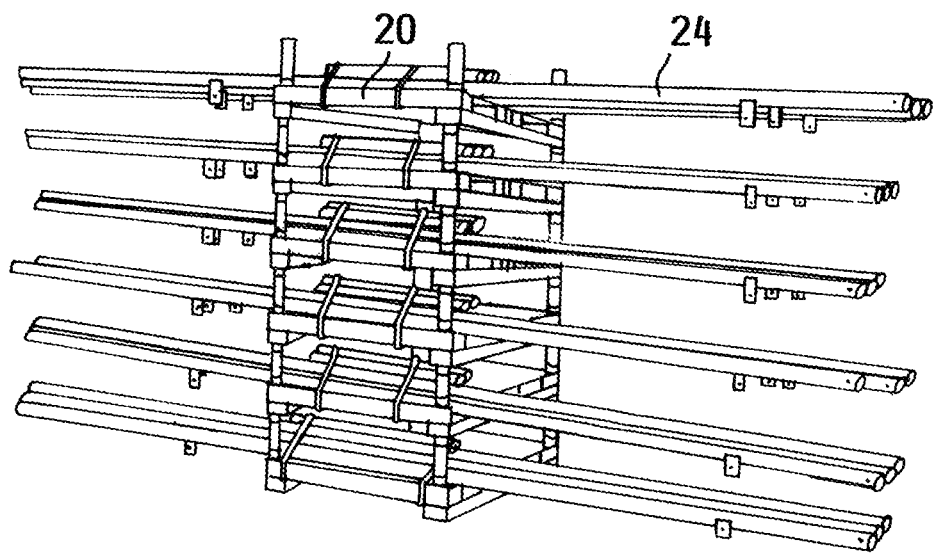
FIG. 11 illustrates a stack of the metal structural components of the portable livestock sun shades in the shipping configuration.

The base 20 and the support structure 24 are initially in a shipping configuration such as illustrated in FIG. 10. When in the shipping configuration, the components of the support structure 24 are secured to the base 20. Since the base 20 is adapted for movement using a device such as a forklift, the shipping configuration enhances the ability to transport the portable livestock sun shade 10. It is also possible to stack a plurality of the portable livestock sun shades 10 when in the shipping configuration as illustrated in FIG. 11.

The ballast container 22 is placed on the base 20 and the ballast container 22 is at least partially filled with water. The vertical support members 40 are attached to the base 20 and then the canopy support members 44 are attached to the vertical support members 40. Depending on the size of the portable livestock sun shade 10, the bracing members 42 and 43 and the diagonal brace members 46 may also be utilized in assembling the portable livestock sun shade 10.

Next, the canopy material 26 is attached to the support structure 24. In certain embodiments, the canopy material 26 is movable between an extended configuration (FIG. 2) and a storage configuration (FIG. 3). The storage configuration minimizes damage to the canopy material 26 such as during the winter and also minimizes the potential of damage of the canopy material from exposure to ultraviolet radiation during times of the year in which the portable livestock sun shade 10 is not being used.

The portable livestock sun shade 10 may be readily moved between the extended configuration and the storage configuration and thereby avoids the need to remove and separately store the canopy material 26 during the winter or during periods in which high velocity winds and/or snow accumulations are anticipated.

Another benefit of the storage configuration is that the canopy material 26 is not stored proximate the ground where it is more likely that the canopy material 26 will be damaged such as by the cattle or rodents.

While the portable livestock sun shade 10 is particularly suited for use in conjunction with agricultural operations such as with cattle, it is also possible to use the portable livestock sun shade 10 in other applications where it is desired to cover persons, animals or objects and where it is desirable to periodically move the device used to cover the persons, animals or objects.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A portable livestock sun shade comprising:
a base;
a support structure mounted with respect to the base, wherein the support structure comprises a plurality of canopy support members;
a ballast container mounted with respect to the base, wherein the ballast container is adapted to receive a ballast material;
a canopy that is attached to the support structure, wherein the canopy is capable of blocking at least a portion of solar rays and wherein the canopy has an area that is greater than an area of the base;
a cable having a first end and a second end, wherein the first end of the cable is attached to one of the canopy support members, wherein the cable engages the canopy; and
a ratchet mechanism attached to one of the canopy support members to which the first end of the cable is not attached, wherein the second end of the cable operably engages the ratchet mechanism.

2. The portable livestock sun shade of claim 1, wherein the base comprises at least one lifting receptacle.

3. The portable livestock sun shade of claim 1, wherein the support structure further comprises:
a plurality of vertical support members that are each attached to the base; and wherein each of the canopy support members are attached to at least one of the vertical support members.

4. The portable livestock sun shade of claim 1, wherein the canopy support members have an arched configuration.

5. The portable livestock sun shade of claim 1, and further comprising a support end section that is operably attached to one of the canopy support members.

6. A portable livestock sun shade comprising
a base;
a support structure mounted with respect to the base;
a ballast container mounted with respect to the base, wherein the ballast container is adapted to receive a ballast material;
a canopy that is attached to the support structure, wherein the canopy is capable of blocking at least a portion of solar rays and wherein the canopy has an area that is greater than an area of the base and wherein the canopy comprises two canopy sections; and
a channel attached to the support structure, wherein the canopy slidably engages the channel.

7. The portable livestock sun shade of claim 6, and further comprising a clamp that engages the canopy and the support structure to retain the canopy in a use configuration.

8. The portable livestock sun shade of claim 1, wherein the ballast container comprises an inlet port and an outlet port that facilitate placing ballast material into the ballast container and removing the ballast material from the ballast container and wherein the ballast material comprises at least one of water and sand.

9. The portable livestock sun shade of claim 6, wherein the support structure comprises:
a plurality of vertical support members that are each attached to the base; and
a plurality of canopy support members, wherein each of the canopy support members are attached to at least one of the vertical support members and wherein the channel extends through at least a portion of the canopy support members.

10. A portable livestock sun shade comprising:
a base;
a support structure mounted with respect to the base;
a ballast container mounted with respect to the base, wherein the ballast container is adapted to receive a ballast material;
a canopy that is attached to the support structure, wherein the canopy is capable of blocking at least a portion of solar rays and wherein the canopy has an area that is greater than an area of the base and wherein the canopy comprises two canopy sections; and
a rope or strap attached to each of the canopy sections for moving the canopy sections from a storage configuration to a use configuration.

11. The portable livestock sun shade of claim 1, wherein at least one edge of the canopy has a concave shape.

12. The portable livestock sun shade of claim 1, wherein the canopy comprises a central region and a border region and wherein the central region is fabricated from a material that is different from a material from which the border region is fabricated.

13. The portable livestock sun shade of claim 1, and further comprising at least one agriculture accessory attached to the support structure.

14. A method of using a portable livestock sun shade comprising:
providing a livestock sun shade comprising a base, a support structure, a ballast container and a canopy, wherein the support structure is mounted with respect to the base, wherein the ballast container is mounted with respect to the base, wherein the canopy is attached to the support structure and wherein the canopy has an area that is greater than an area of the base;

moving the portable livestock sun shade to a location where it is desired to provide shade to livestock;
placing a ballast material in the ballast container; and
blocking at least a portion of solar rays with the canopy.

15. The method of claim 14, wherein the base comprises at least one lifting receptacle that is engaged by a transport vehicle when moving the portable livestock sun shade.

16. The method of claim 14, wherein the support structure comprises:
   a plurality of vertical support members that are each attached to the base; and
   a plurality of canopy support members, wherein each of the canopy support members are attached to at least one of the vertical support members.

17. The method of claim 16, wherein the canopy support members have an arched configuration to place tension on the canopy.

18. The method of claim 16, and further comprising operably attaching a support end section to one of the canopy support members.

19. The method of claim 16, wherein the portable livestock sun shade further comprises a cable and a ratchet mechanism, wherein the cable has a first end and a second end, wherein the first end of the cable is attached to one of the canopy support members, wherein the cable engages the canopy, wherein the ratchet mechanism is attached to one of the canopy support members to which the first end of the cable is not attached and wherein the second end of the cable operably engages the ratchet mechanism.

20. The method of claim 14, wherein the portable livestock sun shade further comprises a channel attached to the support structure and wherein the canopy slidably engages the channel.

21. The method of claim 14, wherein the ballast material comprises at least one of water and sand.

22. The method of claim 14, wherein the canopy comprises two canopy sections and wherein the portable livestock sun shade further comprises a rope or strap attached to each of the canopy sections for moving the canopy sections from a storage configuration to a use configuration.

* * * * *

UNITED STATES PATENT AND TRADEMARK OFFICE
CERTIFICATE OF CORRECTION

PATENT NO. : 10,357,017 B2
APPLICATION NO. : 15/894636
DATED : July 23, 2019
INVENTOR(S) : Christopher Harvey et al.

It is certified that error appears in the above-identified patent and that said Letters Patent is hereby corrected as shown below:

In the Specification

In Column 3, Line 3, "support structure 22" should be --support structure 24--

In Column 4, Lines 19-20 reads: "may function as rub guards that protect the ballast container 22 by cattle rubbing up against it." should read: --may function as rub guards that protect the ballast container 22 from cattle rubbing up against it.--

Signed and Sealed this
Twenty-sixth Day of November, 2019

Andrei Iancu
*Director of the United States Patent and Trademark Office*